(12) United States Patent  
Mabson et al.

(10) Patent No.: US 10,671,768 B2  
(45) Date of Patent: Jun. 2, 2020

(54) FINITE ELEMENT MODELING AND ANALYSIS OF CRACK PROPAGATION IN MULTIPLE PLANES OF A STRUCTURE

(71) Applicant: THE BOEING COMPANY, Chicago, IL (US)

(72) Inventors: Gerald E. Mabson, Bellevue, WA (US); Madhavadas Ramnath, Mukilteo, WA (US); Marianne E. Wilkinson, Redmond, WA (US)

(73) Assignee: THE BOEING COMPANY, Chicago, IL (US)

( * ) Notice: Subject to any disclaimer, the term of this patent is extended or adjusted under 35 U.S.C. 154(b) by 733 days.

(21) Appl. No.: 15/200,920

(22) Filed: Jul. 1, 2016

(65) Prior Publication Data

US 2018/0004889 A1    Jan. 4, 2018

(51) Int. Cl.
| | | |
|---|---|---|
| *G06F 30/15* | (2020.01) | |
| *G06F 30/20* | (2020.01) | |
| *G06F 30/23* | (2020.01) | |
| *G06F 113/26* | (2020.01) | |

(52) U.S. Cl.
CPC .............. *G06F 30/15* (2020.01); *G06F 30/20* (2020.01); *G06F 30/23* (2020.01); *G06F 2113/26* (2020.01)

(58) Field of Classification Search
None
See application file for complete search history.

(56) References Cited

U.S. PATENT DOCUMENTS

| | | | |
|---|---|---|---|
| 7,505,885 B2 | 3/2009 | Deobald et al. | |
| 2004/0148143 A1* | 7/2004 | Deobald | G06F 17/5018 703/2 |
| 2009/0070549 A1* | 3/2009 | Solomon | G06F 15/803 712/10 |

(Continued)

OTHER PUBLICATIONS

Fawaz, Application of the Virtual Crack Closure Technique to Calculate Stress Intensity Factors for Through Cracks with an Oblique Elliptical Crack Front, 1996, Delft University of Technology, pp. 1-57 (Year: 1996).*

(Continued)

*Primary Examiner* — Omar F Fernandez Rivas  
*Assistant Examiner* — Bernard E Cothran  
(74) *Attorney, Agent, or Firm* — Womble Bond Dickinson (US) LLP

(57) ABSTRACT

An apparatus is provided for predicting propagation of a crack in a structure. A finite element model is provided that represents the layers of the structure by meshes of elements having interfaces defined between adjacent elements in orthogonal potential crack planes. Overlapping interface elements are defined at the interfaces and include a plurality of node pairs spaced apart along multiple interfaces and having a node cluster therebetween that includes bound node pairs. The nodes of each node pair are coincident with respective nodes of the adjacent elements on opposite sides of the interface. An analysis of the finite element model under an external load is performed in which a crack tip is established at a node cluster. A strain energy release rate between the nodes of the bound node pairs of the node cluster is calculated and based thereon propagation of the crack is identified.

18 Claims, 11 Drawing Sheets

(56) References Cited

U.S. PATENT DOCUMENTS

2010/0050131 A1* 2/2010 Weise .................. G06F 3/0482
715/853

OTHER PUBLICATIONS

Extended European Search Report dated Nov. 17, 2017 in European application No. 17179123.9.
G. Mabson et al., "Fracture interface elements for static and fatigue analysis", 16th International Conference on Composite Materials, Kyoto, Japan, 2007, pp. 1-10, XP055426297.
Examination Report dated May 27, 2019 in European application No. 17179123.9.

* cited by examiner

● - NODES 204
╫ - INTERFACE ELEMENT 208

FINITE ELEMENT MODELING AND ANALYSIS OF CRACK PROPAGATION IN MULTIPLE PLANES OF A STRUCTURE

TECHNOLOGICAL FIELD

The present disclosure relates generally to numerical modeling and analysis and, in particular, finite element modeling and analysis for predicting propagation of a crack in and throughout multiple planes of a structure including a plurality of layers.

BACKGROUND

Numerical modeling and analysis technology is an important tool in the design and verification of many engineered structures and the structural components of which they are composed. One common computer-based numerical modeling and analysis technique is finite element modeling and analysis. In accordance with various numerical modeling analysis techniques, computer models may define a working environment in terms of geometry, elements, properties, loads, constraints and the like, and can thus be solved and analyzed to determine structural integrity of an engineered structure within that working environment, for example. Through numerical modeling and analysis and in particular finite element analysis, it may be possible to break a complex system down into a manageable (finite) number of elements (e.g., a curve drawn as a series of steps). These computer models and their analysis may be used for several purposes, such as to help determine the behavior of a new airplane product design under various load environments.

Finite element analysis has often been utilized to predict initiation and propagation of existing cracks in structures such as a composite laminate. Once a crack has passed through an initial direction, additional initiations or propagations of the crack may potentially occur in second or third directions. However, existing finite element modeling and analysis techniques are not readily able to predict the initiation and propagation of cracks in two or three planes of a structure.

In particular, the prediction of crack initiation and propagation in a material using existing finite element computer modeling techniques has been hampered by a number of limitations of the techniques. The existing techniques are not able to easily predict the initiation or propagation of cracks in structures containing material or geometric non-linearities or exhibiting non-linear material or geometric response (e.g., as a result of large displacements). Further, some of these techniques require multiple computer runs to propagate the crack which results in tedious post-processing of multiple finite element solutions.

Therefore, it may be desirable to have a system and method that take into account at least some of the issues discussed above, as well as possibly other issues.

BRIEF SUMMARY

Example implementations of the present disclosure are directed to an improved system, method and computer-readable storage medium for predicting propagation of a crack in a structure including a plurality of layers. In particular, the system may provide for propagation of a crack throughout multiple potential crack planes (e.g., two or three planes) of the structure by modeling the potential crack planes using interface elements that overlap throughout multiple dimensions of a finite element model.

In some example implementations, a method is provided for predicting propagation of a crack in a structure including a plurality of layers. The method may comprise producing or receiving a finite element model of the structure in which the plurality of layers are represented by meshes of shell or solid elements and each shell or solid element utilizes a collection of nodes. The meshes of shell or solid elements may have a plurality of interfaces defined in a respective plurality of orthogonal potential crack planes between adjacent shell or solid elements of the meshes of shell or solid elements.

The method may also include defining interface elements throughout the plurality of interfaces. Each interface element includes a plurality of outer node pairs having a node cluster therebetween such that at least a portion of the interface element is within each respective interface of the plurality of interfaces. The nodes of each outer node pair are coincident with respective nodes of the adjacent shell or solid elements on opposite sides of the respective interface. Further, for each respective interface of the plurality of interfaces, each node of the node cluster is bound across the respective interface to an opposing node of the node cluster thereby being a bound node pair. The node and opposing node of the bound node pair are coincident with respective nodes of the adjacent shell or solid elements on opposite sides of the respective interface.

The method may also include performing a finite element failure analysis of the finite element model under an external load which may include establishing a crack having a tip located at the node cluster of the interface element, and calculating a strain energy release rate between the nodes of the bound node pairs of the node cluster under the external load. In at least one instance, the method may also include identifying propagation of the crack along the interface element based on the strain energy release rate so calculated.

In some example implementations of the method of the preceding or any subsequent example implementation, or any combination thereof, the plurality of interfaces include three interfaces in three respective orthogonal potential crack planes, and defining the interface elements includes defining each interface element including at least twelve outer node pairs having an eight node cluster therebetween in which for each respective interface of the three of interfaces, each node of the eight node cluster is bound across the respective interface to an adjacent node of the eight node cluster, and the bound nodes thereby form a cubic shape.

In some example implementations of the method of any preceding or any subsequent example implementation, or any combination thereof, defining the interface elements includes, for each respective interface of the plurality of interfaces, defining a succession of interface elements such that at least one outer node pair of one interface element is positioned at a bound node pair of an adjacent interface element.

In some example implementations of the method of any preceding or any subsequent example implementation, or any combination thereof, defining the interface elements includes defining the interface elements such that the nodes of each bound node pair have infinite stiffness therebetween, and the nodes of each outer node pair have zero stiffness therebetween, and identifying the propagation of the crack includes assigning a zero stiffness between the nodes of each bound node pair within the interface element, through which the crack propagates.

In some example implementations of the method of any preceding or any subsequent example implementation, or any combination thereof, the nodes of the bound node pairs are coincident with one another prior to the propagation of the crack, and identifying the propagation of the crack includes identifying propagation of the crack between the nodes of at least one bound node pair, and in response thereto, unbinding the nodes of the at least one bound node pair such that the nodes thereof are non-coincident with one another to model propagation of the crack.

In some example implementations of the method of any preceding or any subsequent example implementation, or any combination thereof, calculating the strain energy release rate includes calculating at least one force between a bound node pair and a displacement between the nodes of an outer node pair of the interface element, and calculating the strain energy release rate based at least in part on the at least one force and the displacement.

In some example implementations of the method of any preceding or any subsequent example implementation, or any combination thereof, performing the finite element failure analysis includes determining one or more failure modes of the structure based at least in part on the propagation of the crack.

In some example implementations, an apparatus is provided for predicting propagation of a crack in a structure including a plurality of layers. The apparatus comprises a processor and a memory storing executable instructions that, in response to execution by the processor, cause the apparatus to implement a number of subsystems, such as a pre-processing, processing, and post-processing system that may be configured to at least perform the method of any preceding example implementation, or any combination thereof.

In some example implementations, a computer-readable storage medium is provided for predicting propagation of a crack in a structure including a plurality of layers. The computer-readable storage medium is non-transitory and has computer-readable program code portions stored therein that, in response to execution by a processor, cause an apparatus to at least perform the method of any preceding example implementation, or any combination thereof.

These and other features, aspects, and advantages of the present disclosure will be apparent from a reading of the following detailed description together with the accompanying drawings, which are briefly described below. The present disclosure includes any combination of two, three, four or more features or elements set forth in this disclosure, regardless of whether such features or elements are expressly combined or otherwise recited in a specific example implementation described herein. This disclosure is intended to be read holistically such that any separable features or elements of the disclosure, in any of its aspects and example implementations, should be viewed as intended, namely to be combinable, unless the context of the disclosure clearly dictates otherwise.

It will therefore be appreciated that this Brief Summary is provided merely for purposes of summarizing some example implementations so as to provide a basic understanding of some aspects of the disclosure. Accordingly, it will be appreciated that the above described example implementations are merely examples and should not be construed to narrow the scope or spirit of the disclosure in any way. Other example implementations, aspects and advantages will become apparent from the following detailed description taken in conjunction with the accompanying drawings which illustrate, by way of example, the principles of some described example implementations.

BRIEF DESCRIPTION OF THE DRAWING(S)

Having thus described example implementations of the disclosure in general terms, reference will now be made to the accompanying drawings, which are not necessarily drawn to scale, and wherein:

DETAILED DESCRIPTION

Figure 1:
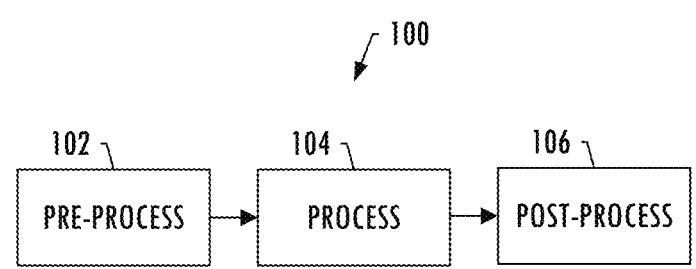
FIG. 1 is an illustration of a numerical modeling and analysis system, according to example implementations of the present disclosure.

Some implementations of the present disclosure will now be described more fully hereinafter with reference to the accompanying drawings, in which some, but not all implementations of the disclosure are shown. Indeed, various implementations of the disclosure may be embodied in many different forms and should not be construed as limited to the implementations set forth herein; rather, these example implementations are provided so that this disclosure will be thorough and complete, and will fully convey the scope of the disclosure to those skilled in the art. For example, unless otherwise indicated, reference to something as being a first, second or the like should not be construed to imply a particular order. Also, for example, reference may be made herein to quantitative measures, values, relationships or the like (e.g., planar, coplanar, perpendicular). Unless otherwise stated, any one or more if not all of these may be absolute or approximate to account for acceptable variations that may occur, such as those due to engineering tolerances or the like. Like reference numerals refer to like elements throughout.

Example implementations of the present disclosure are generally directed to at least processing a numerical model of a physical structure. Example implementations will be primarily described in conjunction with aerospace applications in which the product may be a composite member (e.g., a composite laminate) or metal member or one or more component parts of the member, such as one or more materials thereof. It should be understood, however, that example implementations may be utilized in conjunction with a variety of other applications, both in the aerospace industry and outside of the aerospace industry.

FIG. 1 illustrates a numerical modeling and analysis system 100 according to example implementations of the present disclosure. The numerical modeling and analysis system may be configured to perform a number of different functions or operations, either automatically, under direct operator control, or some combination of thereof. In this regard, the numerical modeling and analysis system may be configured to perform one or more of its functions or operations automatically, that is, without being directly controlled by an operator. Additionally or alternatively, the numerical modeling and analysis system may be configured to perform one or more of its functions or operations under direct operator control.

As explained in greater detail below, in some examples, the numerical modeling and analysis system 100 may be configured to develop an appropriate computer model of a structure, perform an analysis of the structure from the numerical model to produce data, and post-process data produced from the analysis. Example implementations may at times be particularly described in the context of a finite element model of a structure, and performance of a finite element analysis from the finite element model. It should be understood, however, that the numerical modeling system may be configured to develop any of a number of different computer models one or more of which may not be considered a finite element model; and may be configured to perform any of a number of different analyses from the numerical model one or more of which may not be considered finite element analysis.

The numerical modeling and analysis system 100 may include one or more of each of a number of different subsystems (each an individual system) coupled to one another for performing one or more functions or operations. As shown in FIG. 1, for example, the numerical modeling and analysis system may include a pre-processing system 102, processing system 104, and/or post-processing system 106 that may be coupled to one another. Although shown as part of the numerical modeling and analysis system, one or more of the pre-processing system or processing system may instead be separate from but in communication with the numerical modeling and analysis system. It should also be understood that one or more of the subsystems may function or operate as a separate system without regard to others of the subsystems. And further, it should be understood that the numerical modeling and analysis system may include one or more additional or alternative subsystems than those shown in FIG. 1.

The pre-processing system 102 may be generally configured to develop an appropriate computer model (e.g., finite element model) of a structure. The computer model may represent the structure by a mesh of elements although it will be readily understood by a person of ordinary skill in the art that the structure may be represented by any zero, one, two or three dimensional element, such as a bar element for example. The elements may be or include one or more disjointed (non-overlapping) components of a mathematical model in which each element may possess a set of distinguishing points called nodal points or nodes. In some example implementations, the nodal points may be located at the corners and/or end points of the elements such that the geometry of an element may be defined by the placement of geometric sets of nodal points.

The nodal dataset for each set of nodal points may include values of a property or state of the structure at respective nodal points of the set of nodal points. Examples of suitable properties include geometric properties and constitutive properties such as residual thickness, principal curvature, elastic modulus, thermal coefficient of expansion and the like. The constitutive properties may specify the material behavior of the structure at respective nodal points. Examples of suitable states include state variables such as components of the derived stress and strain tensors, and temperature at the respective nodal points. This method may also be applicable to element-based datasets such as element forces, properties, and the like.

As explained in greater detail below, in accordance with example implementations of the present disclosure, the pre-processing system 102 may be generally configured to produce a finite element model of a structure including a plurality of layers in which the plurality of layers are represented by meshes of shell or solid elements. Each shell or solid element may utilize a collection of nodes, and the meshes of shell or solid elements may have a plurality of interfaces defined between adjacent shell or solid elements of the meshes of shell or solid elements. The plurality of interfaces may be within a respective plurality of orthogonal potential crack planes representative of potential cracking within the structure.

The pre-processing system 102 may be further configured to define interface elements throughout the plurality of interfaces. Each interface element may have a plurality of outer node pairs that are spaced apart along the plurality of interface and have a node cluster therebetween such that at least a portion of the interface element is within each respective interface of the plurality of interfaces. The nodes of each outer node pair are coincident with respective nodes of the adjacent shell or solid elements on opposite sides of the respective interface. Further, for each respective interface of the plurality of interfaces, each node of the node cluster is bound across the respective interface to an opposing node of the node cluster which thereby defines a bound node pair. As such, the node cluster may be defined by the plurality of bound node pairs across each of the respective interfaces. Similar to the nodes of the outer node pairs, the node and opposing node of a bound node pair are coincident with respective nodes of the adjacent shell or solid elements on opposite sides of the respective interface.

For its operations, the pre-processing system 102 may benefit from commercially-available software tools. Examples of suitable software tools include computer-aided design (CAD) systems, such as CATIA, SolidWorks or the like, available from Dassault Systèmes S.A. of Vélizy-Villacoublay, France. Other examples of suitable software tools include ABAQUS CAE available from Simulia (a subsidiary of Dassault Systèmes); Altair Hypermesh, available from Altair Engineering, Inc. of Troy, Mich.; PATRAN, available from MSC Software Corporation of Newport Beach, Calif.; the ANSYS software suite, available from ANSYS, Inc. of Canonsburg, Pa.; HyperSizer®, available from Collier Research Corporation of Newport News, Va.; GENESIS, available from Vanderplaats R&D, Inc. of Colorado Springs, Colo.; and the like.

The processing system 104 may be generally configured to perform analysis of the structure from the numerical model. The analysis of the structure may be or include analysis via one or more algorithms (e.g., governing matrix constraints) and/or measurement-based analysis (e.g., mixed-mode fracture analysis). For example, in the context of finite element analysis, the processing system may be configured to derive and solve governing matrix constraints from the numerical model. In some example implementations, the numerical model is a finite model composed of a mesh of finite elements. Each element may be embodied in terms of a finite number of degrees of freedom characterized as a value of an unknown function, or function, at a set of nodal points. An element may further comprise degrees of freedom (DOF) that function as a point at which two elements may be connected and specify the state of the element. The degrees of freedom may be defined as the values and/or derivatives of a state variable at connected nodal points in which a state variable may refer to a variable utilized to describe a mathematical state of a model.

As explained in greater detail below, in the context of a finite element model of a structure including a plurality of layers, the processing system 104 may be generally configured to perform a finite element method (FEM) failure analysis of the finite element model under an external load. This may include establishing a crack having a tip located at the node cluster of the interface element, and calculating a strain energy release rate at a bound node cluster (e.g., between the nodes of the bound node pairs of the node cluster) using the forces from the bound node pairs and displacements from the outer node pairs, under the external load. In at least one instance, the analysis may further include identifying propagation of the crack along the interface based on the strain energy release rate so calculated.

The post-processing system 106 may be configured to check the validity of the solutions from the processing system 104 (e.g., displacements, stresses, specialized stresses, error indicators); and in some examples, the post-processing system may to perform at least one other appropriate analysis on the numerical model and/or solutions.

The processing system 104 and post-processing system 106 may benefit from commercially-available software tools. Examples of suitable tools include Abaqus, available from Dassault Systèmes S.A.; the ANSYS software suite (Fluent); NASTRAN/PATRAN, available from MSC Software Corporation; SolidWorks (COSMOSworks), COMSOL Multiphysics® (FEMLAB), available from COMSOL Inc. of Burlington, Massachsuetts; GENESIS; Altair HyperView, available from Altair Engineering, Inc.; NX (Unigraphics), available from Siemens PLM Software of Plano, Tex.; TAK 2000, available from K&K Associates of Westminster, Colo.; Pro/ENGINEER, available from PTC Inc. of Needham, Mass.; LS-DYNA®, available from Livermore Software Technology Corporation (LSTC) of Livermore, Calif.; and the like.

Figure 2A:
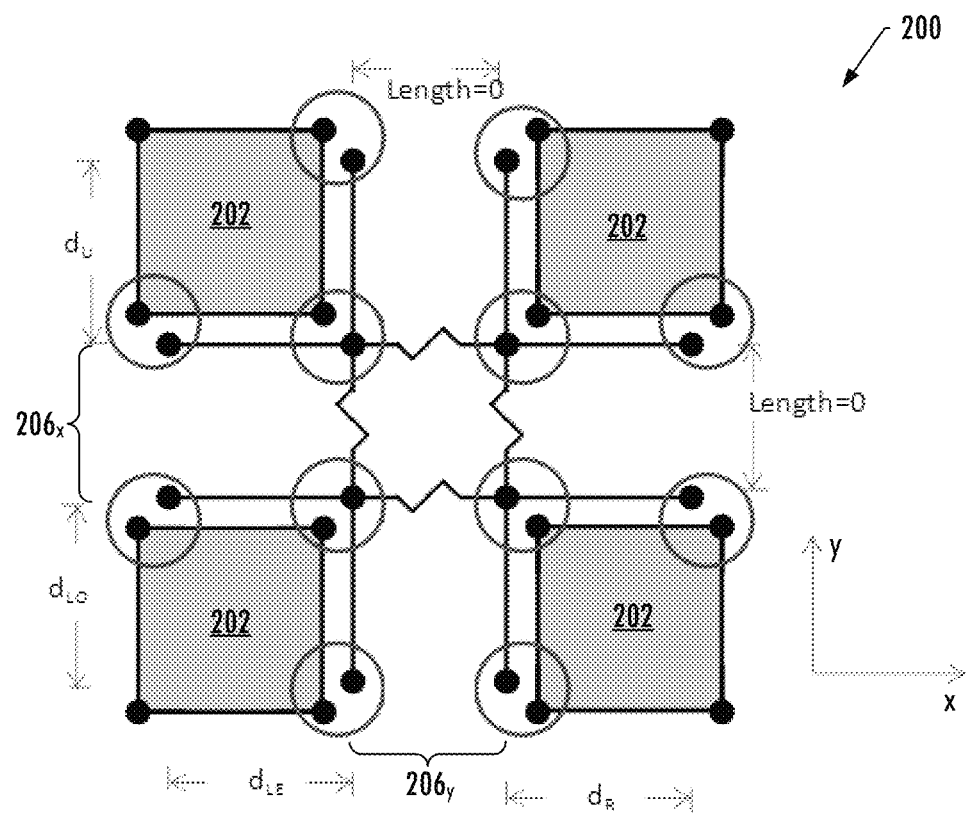
FIGS. 2A, 2B, 2C, 3, 4, 5, 6 and 7 depict a finite element model of a structure, and the elements thereof including a plurality of interface elements, according to example implementations of the present disclosure.

As previously indicated, the pre-processing system 102 may be generally configured to produce or receive the finite element model of the structure including the plurality of layers. FIG. 2A illustrates at least a portion of a suitable finite element model 200 of a structure including a plurality of layers, according to one example implementation. As illustrated, the finite element model may be defined by a mesh of finite elements including a plurality of shell 202 or solid elements (not explicitly illustrated herein) that represent the layers of the structure. Each shell or solid element may be comprised of, or otherwise utilize, a collection of nodes 204. Further, a plurality of interfaces 206 may be defined between adjacent shell or solid elements at a respectively plurality of orthogonal potential crack planes of the structure.

Figure 3:
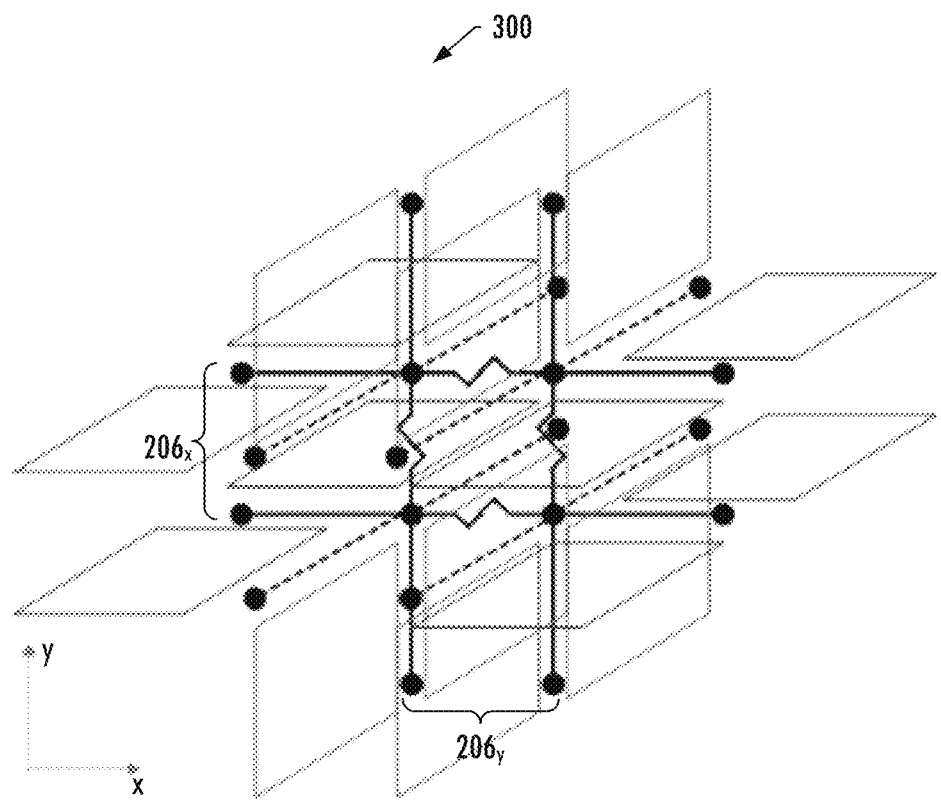
Figure 4:
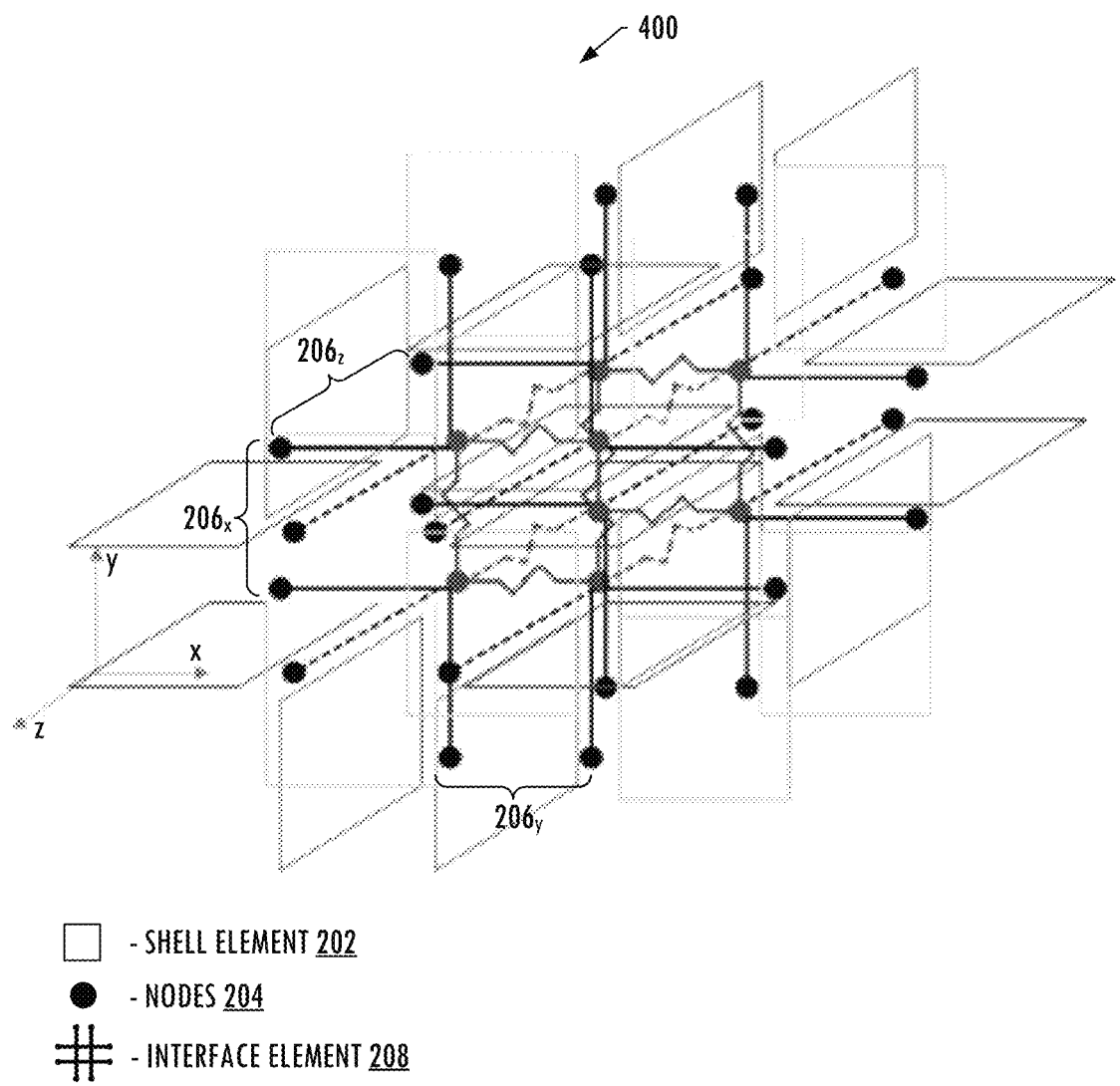

As shown in FIG. 2A, and more particularly shown in FIG. 3, in some examples the structure may have two (2) orthogonal potential crack planes x, y and thereby, at least a portion of the finite element model 200, 300 may have interfaces $206_{x,y}$ defined throughout two (2) planes between adjacent shell or solid elements 202 of the model. In another example, as shown in FIG. 4, the structure may have up to three (3) orthogonal potential crack planes x, y, z and thereby, at least a portion of the finite element model 400 may have interfaces $206_{x,y,z}$ defined throughout three (3) planes between adjacent shell or solid elements of the model. It should be noted that, although the system may predict propagation of cracks throughout multiple interfaces corresponding to multiple orthogonal potential crack planes as shown within the complex finite element models of FIGS. 3 and 4, for simplicity, the example implementations herein may be primarily described with reference to FIG. 2A.

Figure 2B:
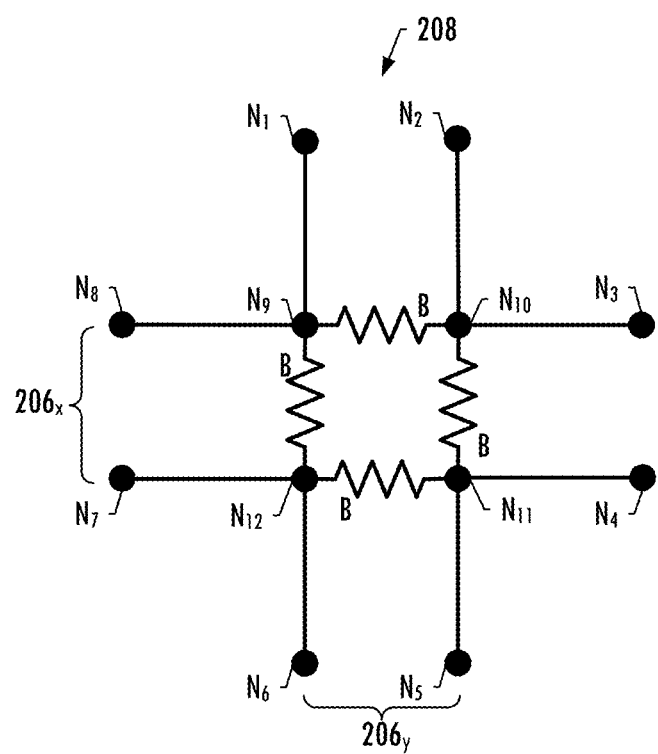

In addition to producing or receiving the finite element model 200, the pre-processing system 102 may also be configured to define an interface element 208 throughout the respective interfaces of the plurality of interfaces 206. As shown, at least a portion of the interface element may be within each respective interface. FIG. 2B more particularly illustrates an interface element according to some example implementations. As shown, each interface element may have a plurality of outer node pairs $N_{i,j}$ (e.g., $N_{1,2}$, $N_{3,4}$, $N_{5,6}$ and $N_{7,8}$) spaced apart throughout the plurality of interfaces, and a node cluster (e.g., $N_{9,10,11,12}$) positioned therebetween. The nodes 204 of each outer node pair are coincident with respective nodes of the adjacent solid elements on opposite sides of the respective interface, as shown by the coincident nodes 210.

For each respective interface of the plurality of interfaces, each node 204 of the node cluster (e.g., $N_{9,10,11,12}$) is bound across the respective interface to an opposing node of the node cluster which thereby forms a bound node pair thereof. For example, the node cluster of FIG. 2B includes two bound node pairs $N_{9,12}$, $N_{19,11}$ across one respective interface $206_x$, and two bound node pairs $N_{9,10}$, $N_{11,12}$ across the other respective interface $206_y$. As shown, the nodes of the node cluster may belong to multiple bound node pairs.

Similar to nodes 204 of the outer node pairs (e.g., $N_{1,2}$, $N_{3,4}$, $N_{5,6}$ and $N_{7,8}$) the nodes and opposing nodes forming the bound node pairs (e.g., $N_{9,12}$, $N_{10,11}$, $N_{9,10}$, and $N_{11,12}$) of the node cluster (e.g., $N_{9,10,11,12}$) are also coincident with respective nodes of the adjacent shell 202 or solid elements on opposite sides of the respective interface 206. In particular, a bound node pair may be bound across the respective interface such that the bond is orthogonal with respect to the interface. In some examples, the pre-processing system 102 may be configured to define the interface elements 208 such that the nodes of each bound node pair have infinite stiffness therebetween prior to crack extension, and the nodes of each outer node pair have zero stiffness therebetween.

Figure 2C:
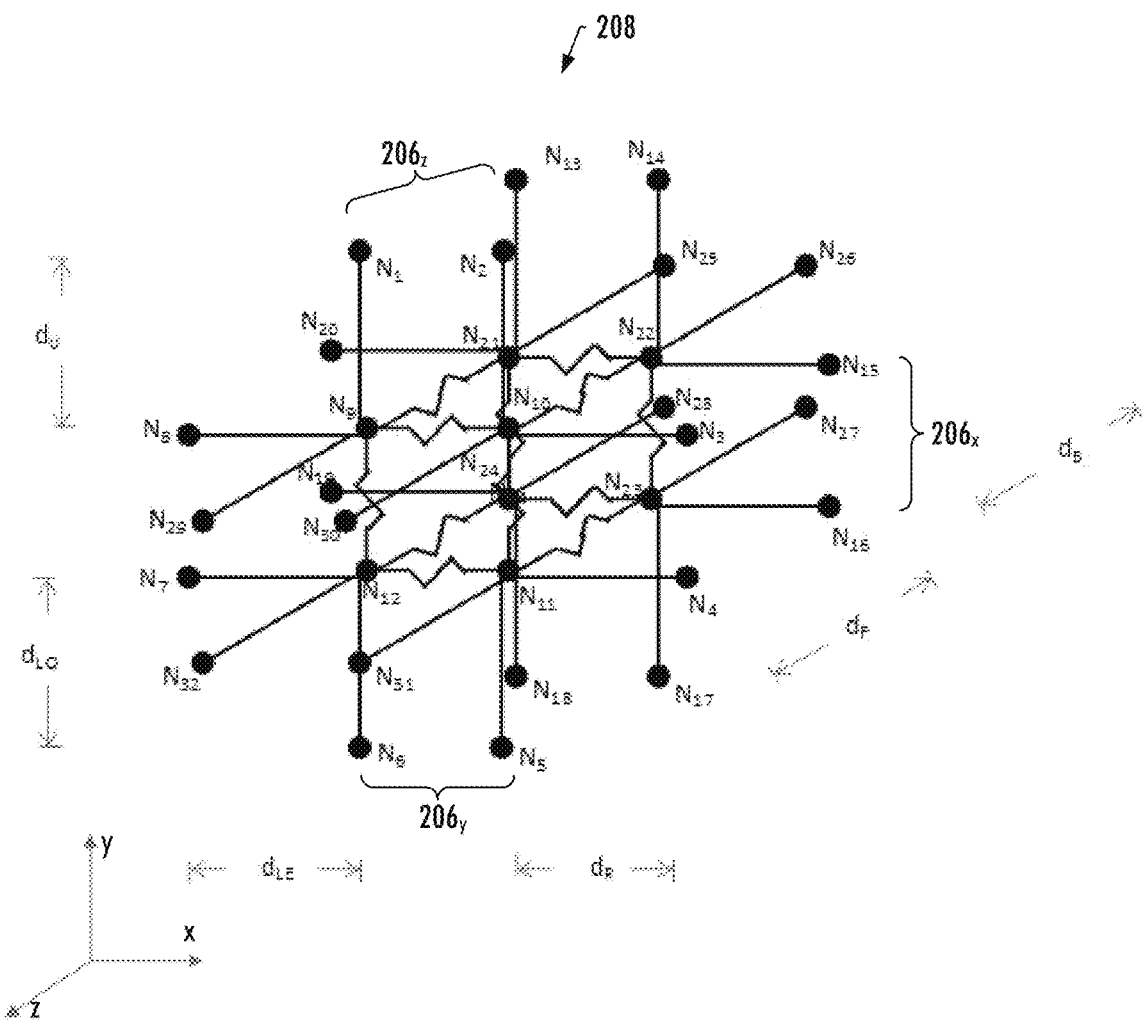

As previously indicated in FIG. 4 and further illustrated by FIG. 2C, in some examples, the plurality of interfaces 206 include three interfaces $206_{x,y,z}$ in three respective orthogonal potential crack planes x, y, z such that the defined the interface element 208 is three-dimensional (3D) and includes twelve (12) or more outer node pairs (e.g., $N_{1,2}$, $N_{3,4}$, $N_{5,6}$, $N_{7,8}$ $N_{13,14}$, $N_{15,16}$, $N_{17,18}$, $N_{19,20}$, $N_{25,26}$, $N_{27,28}$, $N_{29,30}$, and $N_{31,32}$) having an eight (8) node cluster (e.g., $N_{9,10,11,12,21,22,23,24}$) therebetween. Each node of the eight node cluster is bound across each respective interface to an opposing node of the eight node cluster such that the bound node pairs (e.g., $N_{9,10}$, $N_{9,12}$, $N_{9,21}$, $N_{10,11}$ $N_{10,22}$, $N_{11,12}$, $N_{11,23}$, $N_{12,24}$, $N_{21,22}$, $N_{21,24}$, $N_{22,23}$, and $N_{24,23}$) thereby form a cubic shape. Alternatively, a node cluster of a two-dimensional (2D) interface element may form a square shape, as shown in FIGS. 2A, 2B and 3.

Figure 5:
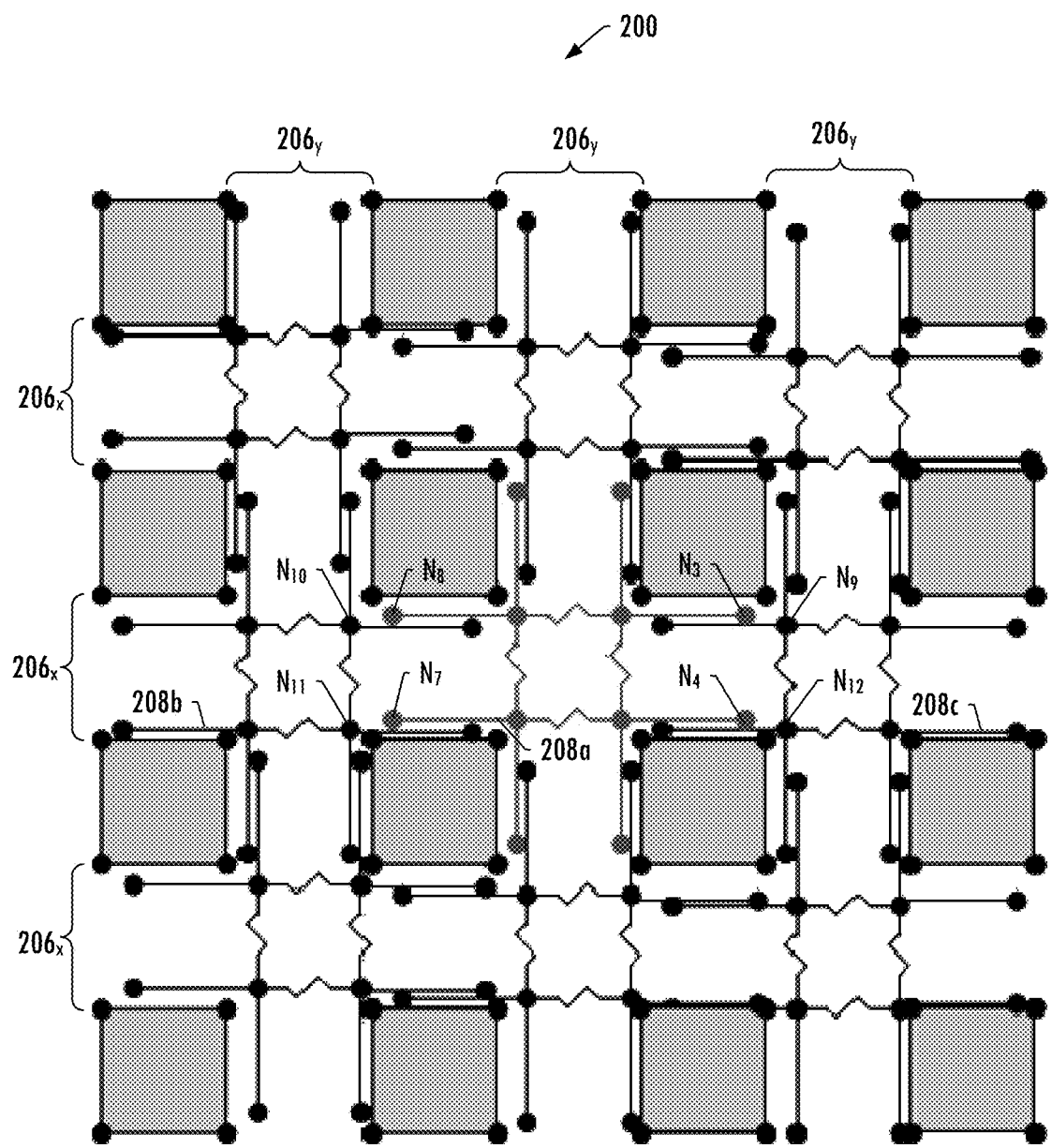

As shown in FIG. 5, a more particular illustration of the interface element 208 of FIGS. 2A and 2B, the pre-processing system 102 may also be configured to define a succession of interface elements that each have a plurality of outer node pairs $N_{i,j}$ spaced apart throughout the respective interfaces 206 and a node cluster therebetween such that at least one outer node pair (e.g., $N_{1,2}$, $N_{3,4}$, $N_{5,6}$ and $N_{7,8}$) of one interface element is positioned at a bound node pair (e.g., $N_{9,12}$, $N_{10,11}$, $N_{9,10}$, and $N_{11,12}$) of an adjacent interface element, the interface elements thereby overlapping. For example, one outer node pair $N_{8,7}$ of an interface element 208a may be positioned at a bound node pair $N_{10,11}$ of an adjacent interface element 208b, and another outer node pair $N_{3,4}$ of the interface element 208a may be positioned at a bound node pair $N_{9,12}$ of another adjacent interface element 208c. In these examples, a crack may propagate horizontally or vertically in multiple directions in which a predetermined direction of the crack is not required as a condition for modeling the crack.

The processing system 104 may be configured to perform a FEM failure analysis of the finite element model 200, or at least a portion thereof, and determine one or more failure modes of the structure based at least in part on the initiation and propagation of the crack. In particular, the processing system may establish a crack having a tip located at the node cluster (e.g., $N_{9,10,11,12}$) of the interface elements 208 and calculate a strain energy release rate between the nodes 204 at a bound node cluster using the forces from the bound node pairs (e.g., $N_{9,12}$, $N_{10,11}$, $N_{9,10}$, and $N_{11,12}$) and displacements from the outer node pairs of the node cluster under the external load. In at least one instance, the processing system may then identify propagation of the crack along the interface element based on the strain energy release rate so calculated.

Figure 6:
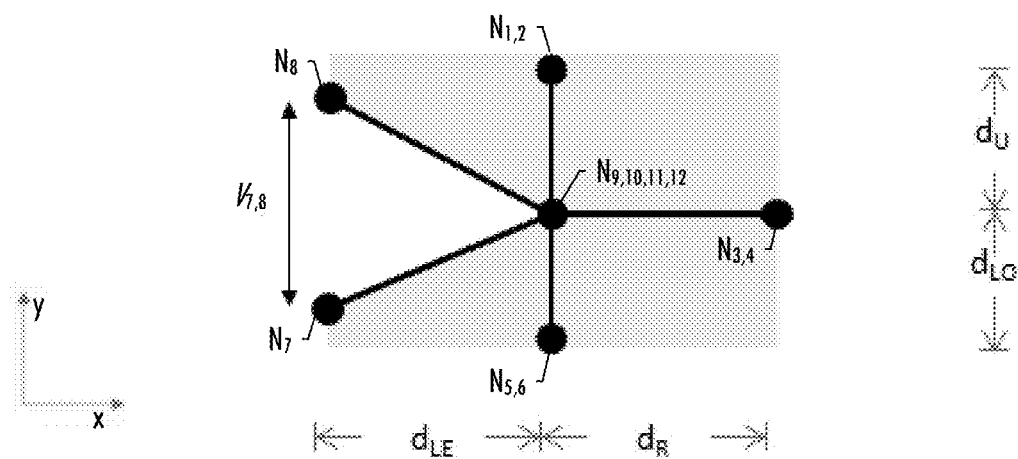
Figure 7:
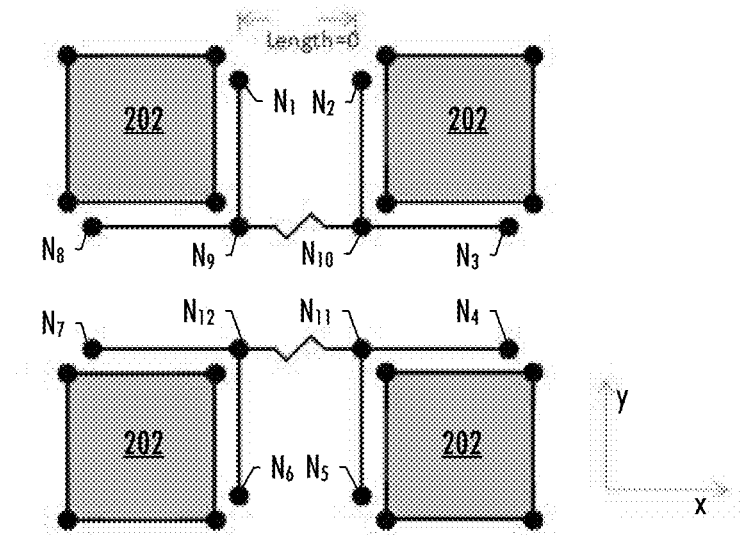

In some examples, the nodes 204 of the plurality of node pairs $N_{i,j}$ are coincident with one another prior to the propagation of the crack. For example, FIG. 6 illustrates a established crack approaching from the left between nodes $N_7$, $N_8$, and contained in an orthogonal potential crack plane y such that the crack tip is located at the nodes of the node cluster $N_{9,10,11,12}$. In these examples, the coincident nodes 210 are a single node. Thus in some examples, the processing system 102 may be configured to identify propagation of the crack between the nodes of a bound node pair, and unbind the nodes of the bound node pair such that the nodes thereof are non-coincident with one another to physically model propagation of the crack. For example, as shown in FIG. 7, in response to identifying the propagation of the crack through the bound node pairs $N_{9,12}$, $N_{10,11}$ across the interface 206x, the nodes thereof $N_{9,10,11,12}$ are unbound across the interface and thereby non-coincident with one another.

In addition to physically modeling propagation of a crack, the processing system 104 may further mathematically model propagation of the crack. As previously indicated, the interface elements 208 may be defined such that the nodes 204 of each bound node pair (e.g., $N_{9,12}$, $N_{10,11}$, $N_{9,10}$, and $N_{11,12}$) have infinite stiffness therebetween, and the nodes of each outer node pair (e.g., $N_{1,2}$, $N_{3,4}$, $N_{5,6}$ and $N_{7,8}$) have zero stiffness therebetween. In these examples, the processing system 104 may be configured to identify propagation of the crack between the nodes of a bound node pair and thereby assign a zero stiffness between the nodes of each bound node pair through which the crack propagates to mathematically model propagation of the crack.

In some examples, the failure analysis performed by the processing system 104 may be or include a mixed-mode fracture analysis such as an analysis using one or more of pure mode I, II or III conditions. In some of these examples, calculating the strain energy release rate may include calculating the forces (e.g., interlaminar or intralaminar forces) between the nodes of the bound node pairs of the node cluster (e.g., $N_{9,12}$, $N_{10,11}$, $N_{9,10}$, and $N_{11,12}$) and the displacements between the outer node pairs 204 of the interface element 208, and thereby calculating the strain energy release rate based at least in part on the forces and the displacements. For example, referring again to FIG. 6 in which the established crack is approaching from the left between nodes $N_7$, $N_8$, using pure mode one conditions, the nodes of the bound node pair may initiate release under the following condition:

$$\frac{1}{2}\frac{v_{7,8}(F_{y,9,12} + F_{y,10,11})}{bd_{LE}} = G_{IC},$$

in which $G_{IC}$ is the critical mode I strain energy release rate, b is the width into the page, $d_{LE}$ is dimensions of the left side of the interface element, $F_{y,9,12}+F_{y,10,11}$ is the combined vertical force between the nodes of the bound node pairs, and $v_{7,8}$ is the vertical displacement between the nodes $N_7$, $N_8$.

In another example, using pure mode two conditions, the nodes of the bound node pair may initiate release under the following condition:

$$\frac{1}{2}\frac{u_{7,8}(F_{x,9,12} + F_{x,10,11})}{bd_{LE}} = G_{IIC},$$

in which $G_{IIC}$ is the critical mode II strain energy release rate, b is the width into the page, $d_{LE}$ is the dimensions of the left side of the interface element, $F_{x,9,12}+F_{x,10,11}$ is the combined horizontal force between the nodes of the bound node pairs, and $u_{7,8}$ is the horizontal displacement between the nodes $N_7$, $N_8$.

In yet another example, using mixed-mode conditions such as a combination of pure mode I and II conditions, the nodes of the bound node pair may initiate release under the following condition:

$$\left(\frac{G_I}{G_{IC}}\right)^m + \left(\frac{G_{II}}{G_{IIC}}\right)^n \geq 1,$$

$$G_I = \frac{1}{2}\frac{v_{7,8}(F_{y,9,12} + F_{y,10,11})}{bd_{LE}},$$

$$G_{II} = \frac{1}{2}\frac{u_{7,8}(F_{x,9,12} + F_{x,10,11})}{bd_{LE}},$$

for crack propagation in which m and n are input parameters for controlling interactions. In particular, the constants (m and n) are material parameters that control the interaction between mode I and mode II crack propagation using this mixed mode criterion. It should be noted that other mixed mode criteria may also be used. In these examples, u is the horizontal displacement, $F_x$ is the horizontal force, $F_y$ is the vertical force, $d_R$ and $d_{LE}$ are respectively dimensions on the right and left side of the interface element 208, and $G_{IC}$ and $G_{IIC}$ are respectively the critical mode strain energy release rates for pure I and II.

Referring again to FIGS. 2C and 4, in some of these examples in which the structure may have three (3) orthogonal potential crack planes x, y, z and three interfaces $206_{x,y,z}$ defined throughout, three strain energy release rate may be calculated based on the force between the bound node pairs of the node cluster (e.g., $N_{9,10}$, $N_{9,12}$, $N_{9,21}$, $N_{10,11}$ $N_{10,22}$, $N_{11,12}$, $N_{11,23}$, $N_{12,24}$, $N_{21,22}$, $N_{21,24}$, $N_{22,23}$, and $N_{24,23}$) and the displacements between the outer node pairs of the nodes 204 of the interface element 208, and thereby calculating the strain energy release rate based at least in part on the forces and displacements.

For example, for a crack in the x,z plane approaching uniformly from the negative x direction, the nodes of the bound node pairs may initiate release under the following respective pure mode I, II or III conditions:

$$\frac{1}{2}\frac{v_{7,8}(F_{y,9,12} + F_{y,10,11} + F_{y,21,24} + F_{y,22,23})}{d_{LE}}\left(\frac{2}{d_F + d_B}\right) = G_{IC}$$

-continued $$\frac{1}{2}\frac{u_{7,8}(F_{x,9,12}+F_{x,10,11}+F_{x,21,24}+F_{x,22,23})}{d_{LE}}\left(\frac{2}{d_F+d_B}\right)=G_{IIC}$$

$$\frac{1}{2}\frac{w_{7,8}(F_{z,9,12}+F_{z,10,11}+F_{z,21,24}+F_{z,22,23})}{d_{LE}}\left(\frac{2}{d_F+d_B}\right)=G_{IIIC}$$

in which $G_{IC}$, $G_{IIC}$ $G_{IIIC}$ are respectively the critical mode I, II and III strain energy release rates, $d_{LE}$ is the dimensions of the left side of the interface element 208, $F_{9,12}+F_{10,11}+F_{21,24}+F_{22,23}$ with respect to x,y,z is respectively the combined horizontal, vertical or normal forces between the nodes of the bound node pairs, and $u_{7,8}$, $v_{7,8}$, and $w_{7,8}$ are respectively the horizontal vertical or normal displacement between the nodes $N_7$, $N_8$.

In another example, for a crack in the y,z plane approaching uniformly from the negative y direction, the nodes of the bound node pairs may initiate release under the following respective pure mode one (1), two (2) or three (3) conditions:

$$\frac{1}{2}\frac{u_{5,6}(F_{x,9,10}+F_{x,11,12}+F_{x,23,24}+F_{x,21,22})}{d_{LO}}\left(\frac{2}{d_F+d_B}\right)=G_{IC}$$

$$\frac{1}{2}\frac{v_{5,6}(F_{y,9,10}+F_{y,11,12}+F_{y,23,24}+F_{y,21,22})}{d_{LO}}\left(\frac{2}{d_F+d_B}\right)=G_{IIC}$$

$$\frac{1}{2}\frac{w_{5,6}(F_{z,9,10}+F_{z,11,12}+F_{z,23,24}+F_{z,21,22})}{d_{LO}}\left(\frac{2}{d_F+d_B}\right)=G_{IIIC}$$

in which $G_{IC}$, $G_{IIC}$ $G_{IIIC}$ are respectively the critical mode I, II and III strain energy release rates, $d_{LO}$ is the dimensions of the lower side of the interface element 208, $F_{9,10}+F_{11,12}+F_{23,24}+F_{21,22}$ with respect to x,y,z is respectively the combined horizontal, vertical or normal forces between the nodes of the bound node pairs, and $u_{5,6}$, $v_{5,6}$, and $w_{5,6}$ are respectively the horizontal vertical or depth displacement between the nodes $N_5$, $N_6$.

In yet another example, for a crack in the x,y plane approaching uniformly from the negative x direction, the nodes of the bound node pairs may initiate release under the following respective pure mode one (1), two (2) or three (3) conditions:

$$\frac{1}{2}\frac{w_{8,20}(F_{z,9,21}+F_{z,10,22}+F_{z,12,24}+F_{z,11,23})}{d_{LE}}\left(\frac{2}{d_U+d_{LO}}\right)=G_{IC}$$

$$\frac{1}{2}\frac{u_{8,20}(F_{x,9,21}+F_{x,10,22}+F_{x,12,24}+F_{x,1123})}{d_{LE}}\left(\frac{2}{d_U+d_{LO}}\right)=G_{IIC}$$

$$\frac{1}{2}\frac{v_{8,20}(F_{y,9,21}+F_{y,10,22}+F_{y,12,24}+F_{y,11,23})}{d_{LE}}\left(\frac{2}{d_U+d_{LO}}\right)=G_{IIIC}$$

in which $G_{IC}$, $G_{IIC}$ $G_{IIIC}$ are respectively the critical mode I, II and III strain energy release rates, $d_{LE}$ is the dimensions of the left side of the interface element 208, $F_{9,21}+F_{10,22}+F_{12,24}+F_{11,23}$ with respect to x,y,z is respectively the combined horizontal, vertical or normal forces between the nodes of the bound node pairs, and $u_{8,20}$ $v_{8,20}$, and $w_{8,20}$ are respectively the horizontal vertical or normal displacement between the nodes $N_8$, $N_{20}$.

Figure 8A:
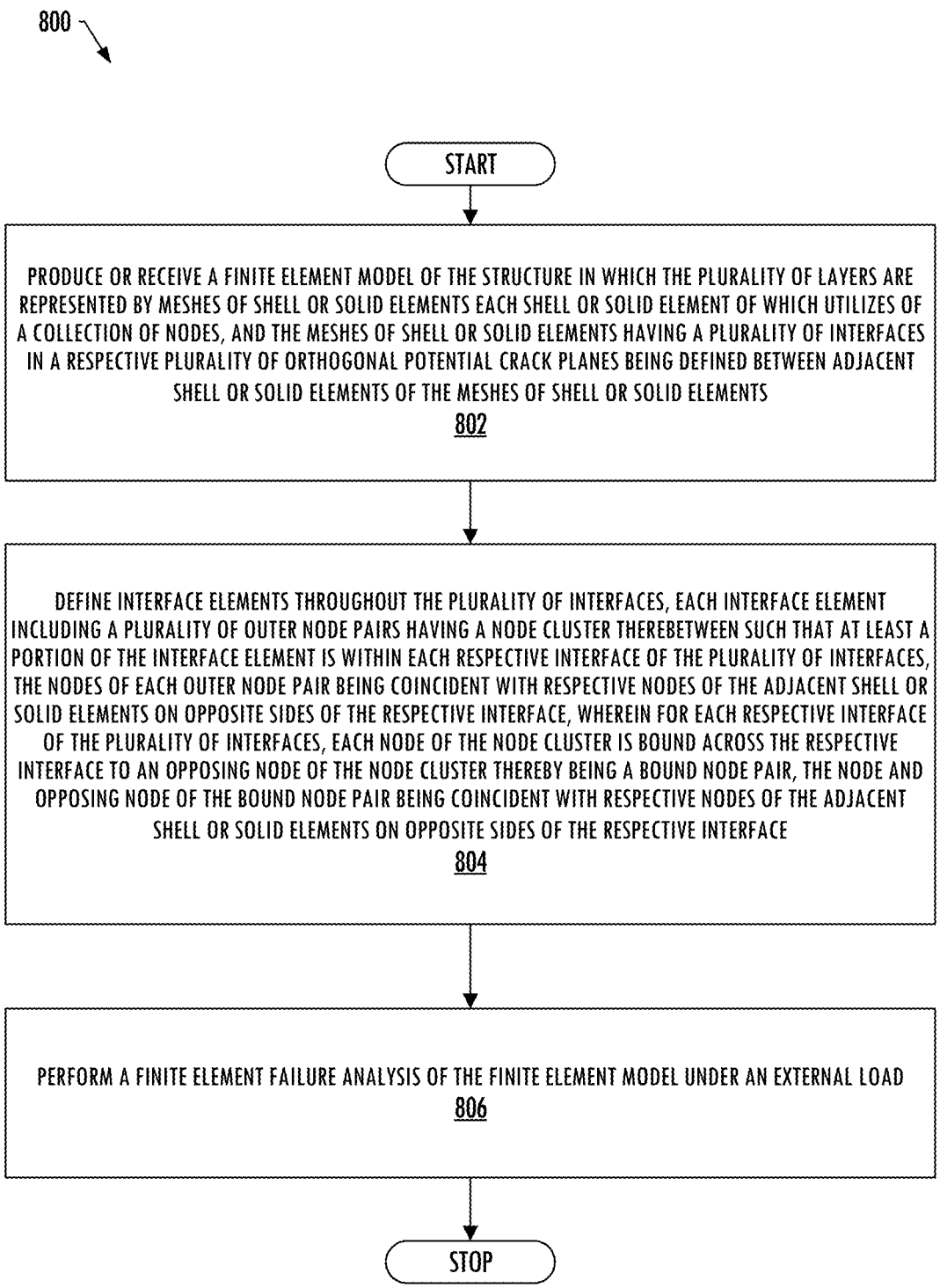
FIGS. 8A and 8B are flow diagrams illustrating various operations of a method for at least post processing a finite element model, in accordance with an example implementation.

FIG. 8A illustrates a flowchart including various operations of a method 800 for finite element modeling and analysis of crack propagation in a structure in accordance with an example implementation of the present disclosure. As shown at block 802, the method may include producing or receiving a finite element model of the structure in which the plurality of layers are represented by meshes of shell or solid elements in which each shell or solid element is composed of a collection of nodes. The meshes of shell or solid elements may have a plurality of interfaces defined in a respective plurality of orthogonal potential crack planes between adjacent shell or solid elements of the meshes of shell or solid elements.

Figure 8B:
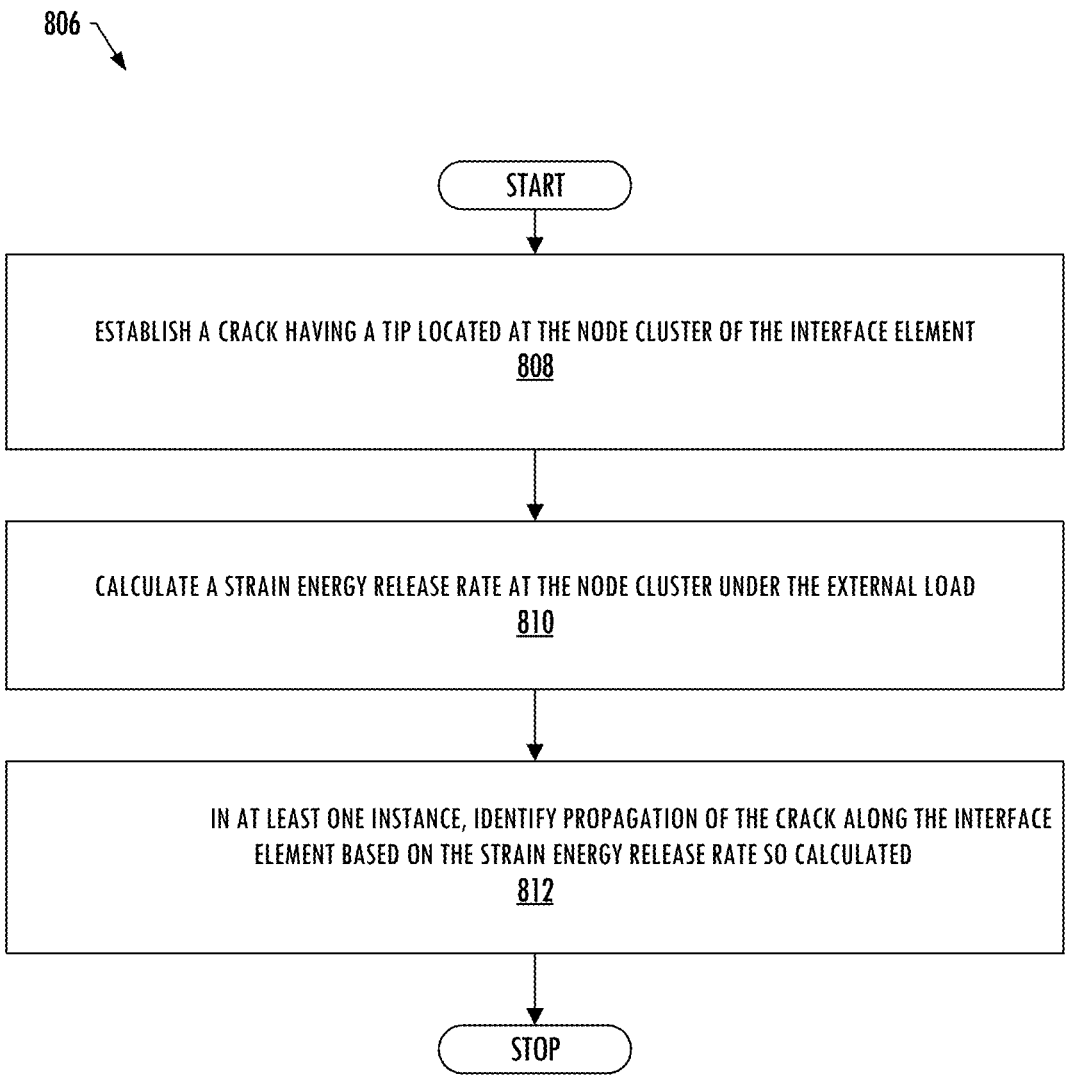

The method 800 may also include defining interface elements throughout the plurality of interfaces, as shown at block 804. Each interface element may include a plurality of outer node pairs that have a node cluster therebetween such that at least a portion of the interface element is within each respective interface of the plurality of interfaces. The nodes of each outer node pair are coincident with respective nodes of the adjacent shell or solid elements on opposite sides of the respective interface. For each respective interface of the plurality of interfaces, each node of the node cluster is bound across the respective interface to an opposing node of the node cluster thereby being a bound node pair. The node and opposing node of the bound node pair are coincident with respective nodes of the adjacent shell or solid elements on opposite sides of the respective interface As shown at block 806, the method 800 may also include performing a finite element failure analysis of the finite element model under an external load. FIG. 8B illustrates a flowchart including various sub-operations of the method step 806 of FIG. 8A including establishing a crack having a tip located at the node cluster of the interface element, as shown at block 808, and calculating a strain energy release rate at the node cluster (e.g., between the nodes of the bound node pairs of the node cluster) under the external load, as shown at block 810. In at least one instance, the method step may further include identifying propagation of the crack the within the interface element based on the strain energy release rate so calculated, as shown at block 812.

According to example implementations of the present disclosure, the system 100 and its subsystems and/or components including the pre-processing system 102, processing system 104, and/or post-processing system 106 may be implemented by various means. Means for implementing the systems, subsystems and their respective elements may include hardware, alone or under direction of one or more computer programs from a computer-readable storage medium.

In some examples, one or more apparatuses may be provided that are configured to function as or otherwise implement the systems, subsystems, tools and respective elements shown and described herein. In examples involving more than one apparatus, the respective apparatuses may be connected to or otherwise in communication with one another in a number of different manners, such as directly or indirectly via a wired or wireless network or the like.

Figure 9:
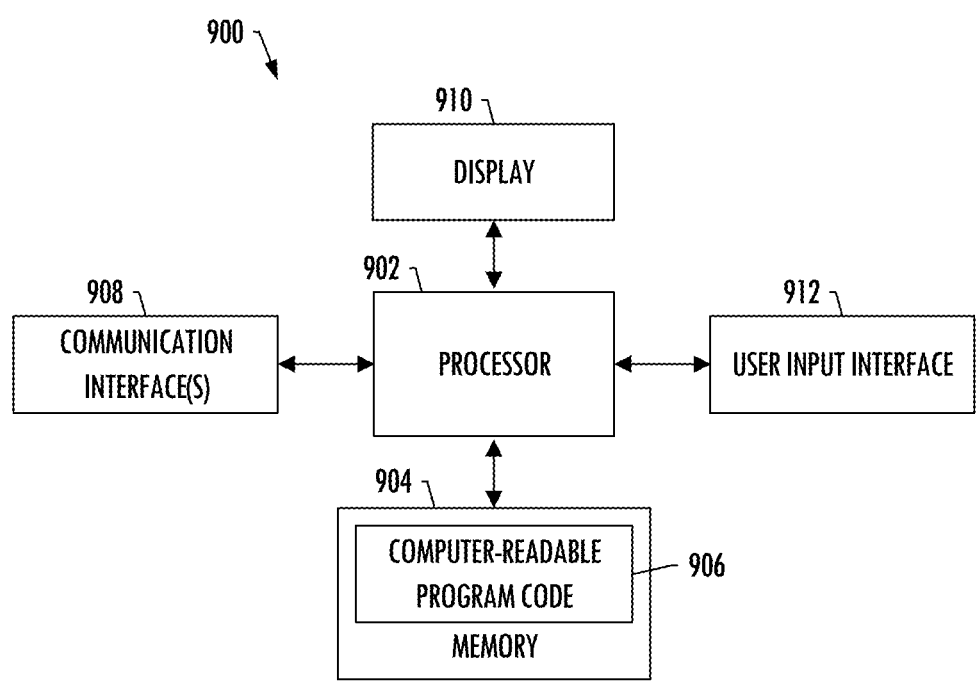
FIG. 9 illustrates an apparatus according to some example implementations.

FIG. 9 illustrates an apparatus 900 according to some example implementations of the present disclosure. Generally, an apparatus of example implementations of the present disclosure may comprise, include or be embodied in one or more fixed or portable electronic devices. Examples of suitable electronic devices include a smartphone, tablet computer, laptop computer, desktop computer, workstation computer, server computer or the like. The apparatus may include one or more of each of a number of components such as, for example, a processor 902 (e.g., processor unit) connected to a memory 904 (e.g., storage device).

The processor 902 is generally any piece of computer hardware that is capable of processing information such as, for example, data, computer programs and/or other suitable electronic information. The processor is composed of a collection of electronic circuits some of which may be packaged as an integrated circuit or multiple interconnected integrated circuits (an integrated circuit at times more commonly referred to as a "chip"). The processor may be configured to execute computer programs, which may be stored onboard the processor or otherwise stored in the memory 904 (of the same or another apparatus).

The processor 902 may be a number of processors, a multi-processor core or some other type of processor, depending on the particular implementation. Further, the processor may be implemented using a number of heterogeneous processor systems in which a main processor is present with one or more secondary processors on a single chip. As another illustrative example, the processor may be a symmetric multi-processor system containing multiple processors of the same type. In yet another example, the processor may be embodied as or otherwise include one or more application-specific integrated circuits (ASICs), field-programmable gate arrays (FPGAs) or the like. Thus, although the processor may be capable of executing a computer program to perform one or more functions, the processor of various examples may be capable of performing one or more functions without the aid of a computer program.

The memory 904 is generally any piece of computer hardware that is capable of storing information such as, for example, data, computer programs (e.g., computer-readable program code 906) and/or other suitable information either on a temporary basis and/or a permanent basis. The memory may include volatile and/or non-volatile memory, and may be fixed or removable. Examples of suitable memory include random access memory (RAM), read-only memory (ROM), a hard drive, a flash memory, a thumb drive, a removable computer diskette, an optical disk, a magnetic tape or some combination of the above. Optical disks may include compact disk-read only memory (CD-ROM), compact disk-read/write (CD-R/W), DVD or the like. In various instances, the memory may be referred to as a computer-readable storage medium. The computer-readable storage medium is a non-transitory device capable of storing information, and is distinguishable from computer-readable transmission media such as electronic transitory signals capable of carrying information from one location to another. Computer-readable medium as described herein may generally refer to a computer-readable storage medium or computer-readable transmission medium.

In addition to the memory, the processor may also be connected to one or more interfaces for displaying, transmitting and/or receiving information. The interfaces may include a communications interface (e.g., communications unit) and/or one or more user interfaces. The communications interface may be configured to transmit and/or receive information, such as to and/or from other apparatus(es), network(s) or the like. The communications interface may be configured to transmit and/or receive information by physical (wired) and/or wireless communications links. Examples of suitable communication interfaces include a network interface controller (NIC), wireless NIC (WNIC) or the like.

The user interfaces may include a display 910 and/or one or more user input interfaces 912 (e.g., input/output unit). The display may be configured to present or otherwise display information to a user, suitable examples of which include a liquid crystal display (LCD), light-emitting diode display (LED), plasma display panel (PDP) or the like.

The user input interfaces 912 may be wired or wireless, and may be configured to receive information from a user into the apparatus, such as for processing, storage and/or display. Suitable examples of user input interfaces include a microphone, image or video capture device, keyboard or keypad, joystick, touch-sensitive surface (separate from or integrated into a touchscreen), biometric sensor or the like. The user interfaces may further include one or more interfaces for communicating with peripherals such as printers, scanners or the like.

As indicated above, program code instructions may be stored in memory, and executed by a processor, to implement functions of the systems, subsystems and their respective elements described herein. As will be appreciated, any suitable program code instructions may be loaded onto a computer or other programmable apparatus from a computer-readable storage medium to produce a particular machine, such that the particular machine becomes a means for implementing the functions specified herein. These program code instructions may also be stored in a computer-readable storage medium that can direct a computer, a processor or other programmable apparatus to function in a particular manner to thereby generate a particular machine or particular article of manufacture. The instructions stored in the computer-readable storage medium may produce an article of manufacture, where the article of manufacture becomes a means for implementing functions described herein. The program code instructions may be retrieved from a computer-readable storage medium and loaded into a computer, processor or other programmable apparatus to configure the computer, processor or other programmable apparatus to execute operations to be performed on or by the computer, processor or other programmable apparatus.

Retrieval, loading and execution of the program code instructions may be performed sequentially such that one instruction is retrieved, loaded and executed at a time. In some example implementations, retrieval, loading and/or execution may be performed in parallel such that multiple instructions are retrieved, loaded, and/or executed together. Execution of the program code instructions may produce a computer-implemented process such that the instructions executed by the computer, processor or other programmable apparatus provide operations for implementing functions described herein.

Execution of instructions by a processor, or storage of instructions in a computer-readable storage medium, supports combinations of operations for performing the specified functions. In this manner, an apparatus 900 may include a processor 902 and a computer-readable storage medium or memory 904 coupled to the processor, where the processor is configured to execute computer-readable program code 906 stored in the memory. It will also be understood that one or more functions, and combinations of functions, may be implemented by special purpose hardware-based computer systems and/or processors which perform the specified functions, or combinations of special purpose hardware and program code instructions.

Many modifications and other implementations of the disclosure set forth herein will come to mind to one skilled in the art to which the disclosure pertains having the benefit of the teachings presented in the foregoing description and the associated drawings. Therefore, it is to be understood that the disclosure is not to be limited to the specific implementations disclosed and that modifications and other implementations are intended to be included within the scope of the appended claims. Moreover, although the foregoing description and the associated drawings describe example implementations in the context of certain example combinations of elements and/or functions, it should be appreciated that different combinations of elements and/or functions may be provided by alternative implementations without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. An apparatus for predicting propagation of a crack in a structure including a plurality of layers, the apparatus comprising a processor and a memory storing executable instructions that, in response to execution by the processor, cause the apparatus to at least:

produce or receive a finite element model of the structure in which the plurality of layers are represented by meshes of shell or solid elements each shell or solid element of which utilizes a collection of nodes, and the meshes of shell or solid elements having a plurality of interfaces in a respective plurality of orthogonal potential crack planes being defined between adjacent shell or solid elements of the meshes of shell or solid elements and extending through multiple directions in multiple dimensions of the finite element model, wherein the plurality of interfaces includes three interfaces in three respective orthogonal potential crack planes;

define interface elements throughout the plurality of interfaces, each interface element including at least twelve outer node pairs having an eight node cluster therebetween such that at least a portion of the interface element is within each respective interface of the plurality of interfaces, the nodes of each outer node pair being coincident with respective nodes of the adjacent shell or solid elements on opposite sides of the respective interface, wherein for each respective interface of the three interfaces, each node of the eight node cluster is bound across the respective interface to an adjacent node of the eight node cluster thereby being a bound node pair and thereby forming a cubic shape, the node and adjacent node of the bound node pair being coincident with respective nodes of the adjacent shell or solid elements on opposite sides of the respective interface; and perform a finite element failure analysis of the finite element model under an external load, including the apparatus being caused to:

establish a crack having a tip located at the node cluster of the interface element; and calculate a strain energy release rate between the nodes of the bound node pairs of the node cluster under the external load; and in at least one instance, identify propagation of the crack along the interface element based on the strain energy release rate so calculated.

2. The apparatus of claim 1, wherein the apparatus being caused to define the interface elements includes, for each respective interface of the plurality of interfaces, the apparatus being caused to define a succession of interface elements such that at least one outer node pair of one interface element is positioned at a bound node pair of an adjacent interface element.

3. The apparatus of claim 1, wherein the apparatus being caused to define the interface elements include being caused to define the interface elements such that the nodes of each bound node pair have infinite stiffness therebetween, and the nodes of each outer node pair have zero stiffness therebetween, and wherein the apparatus being caused to identify the propagation of the crack includes being caused to assign a zero stiffness between the nodes of each bound node pair within the interface element, through which the crack propagates.

4. The apparatus of claim 1, wherein the nodes of the bound node pairs are coincident with one another prior to the propagation of the crack, and wherein the apparatus being caused to identify the propagation of the crack includes being caused to:

identify propagation of the crack between the nodes of at least one bound node pair; and in response thereto, unbind the nodes of the at least one bound node pair such that the nodes thereof are non-coincident with one another to model propagation of the crack.

5. The apparatus of claim 1, wherein the apparatus being caused to calculate the strain energy release rate includes being caused to:

calculate at least one force between a bound node pair and a displacement between the nodes of an outer node pair of the interface element; and calculate the strain energy release rate based at least in part on the at least one force and the displacement.

6. The apparatus of claim 1, wherein the apparatus being caused to perform the finite element failure analysis includes being caused to determine one or more failure modes of the structure based at least in part on the propagation of the crack.

7. A method for predicting propagation of a crack in a structure including a plurality of layers, the method comprising:

producing or receiving a finite element model of the structure in which the plurality of layers are represented by meshes of shell or solid elements each shell or solid element of which utilizes a collection of nodes, and the meshes of shell or solid elements having a plurality of interfaces in a respective plurality of orthogonal potential crack planes being defined between adjacent shell or solid elements of the meshes of shell or solid elements and extending through multiple directions in multiple dimensions of the finite element model, wherein the plurality of interfaces includes three interfaces in three respective orthogonal potential crack planes;

defining interface elements throughout the plurality of interfaces, each interface element including at least twelve outer node pairs having an eight node cluster therebetween such that at least a portion of the interface element is within each respective interface of the plurality of interfaces, the nodes of each outer node pair being coincident with respective nodes of the adjacent shell or solid elements on opposite sides of the respective interface, wherein for each respective interface of the three interfaces, each node of the eight node cluster is bound across the respective interface to an adjacent node of the eight node cluster thereby being a bound node pair and thereby forming a cubic shape, the node and adjacent node of the bound node pair being coincident with respective nodes of the adjacent shell or solid elements on opposite sides of the respective interface; and performing a finite element failure analysis of the finite element model under an external load, including the apparatus being caused to:
    establishing a crack having a tip located at the node cluster of the interface element; and
    calculating a strain energy release rate between the nodes of the bound node pairs of the node cluster under the external load; and in at least one instance,
    identifying propagation of the crack along the interface element based on the strain energy release rate so calculated.

8. The method of claim 7, wherein defining the interface elements includes, for each respective interface of the plurality of interfaces, defining a succession of interface elements such that at least one outer node pair of one interface element is positioned at a bound node pair of an adjacent interface element.

9. The method of claim 7, wherein defining the interface elements includes defining the interface elements such that the nodes of each bound node pair have infinite stiffness therebetween, and the nodes of each outer node pair have zero stiffness therebetween, and
    wherein identifying the propagation of the crack includes being caused to assign a zero stiffness between the nodes of each bound node pair within the interface element, through which the crack propagates.

10. The method of claim 7, wherein the nodes of the bound node pairs are coincident with one another prior to the propagation of the crack, and wherein identifying the propagation of the crack includes:
    identifying propagation of the crack between the nodes of at least one bound node pair; and in response thereto,
    unbinding the nodes of the at least one bound node pair such that the nodes thereof are non-coincident with one another to model propagation of the crack.

11. The method of claim 7, wherein calculating the strain energy release rate includes:
    calculating at least one force between a bound node pair and a displacement between the nodes of an outer node pair of the interface element; and
    calculating the strain energy release rate based at least in part on the at least one force and the displacement.

12. The method of claim 7, wherein performing the finite element failure analysis includes determining one or more failure modes of the structure based at least in part on the propagation of the crack.

13. A computer-readable storage medium for predicting propagation of a crack in a structure including a plurality of layers, the computer-readable storage medium being non-transitory and having computer-readable program code portions stored therein that in response to execution by a processor, cause an apparatus to at least:
    produce or receive a finite element model of the structure in which the plurality of layers are represented by meshes of shell or solid elements each shell or solid element of which utilizes a collection of nodes, and the meshes of shell or solid elements having a plurality of interfaces in a respective plurality of orthogonal potential crack planes being defined between adjacent shell or solid elements of the meshes of shell or solid elements and extending through multiple directions in multiple dimensions of the finite element model, wherein the plurality of interfaces include three interfaces in three respective orthogonal potential crack planes;
    define interface elements throughout the plurality of interfaces, each interface element including at least twelve outer node pairs having an eight node cluster therebetween such that at least a portion of the interface element is within each respective interface of the plurality of interfaces, the nodes of each outer node pair being coincident with respective nodes of the adjacent shell or solid elements on opposite sides of the respective interface,
    wherein for each respective interface of the three interfaces, each node of the eight node cluster is bound across the respective interface to an adjacent node of the eight node cluster thereby being a bound node pair, the node and opposing node of the bound node pair being coincident with respective nodes of the adjacent shell or solid elements on opposite sides of the respective interface; and
    perform a finite element failure analysis of the finite element model under an external load, including the apparatus being caused to:
        establish a crack having a tip located at the node cluster of the interface element; and
        calculate a strain energy release rate between the nodes of the bound node pairs of the node cluster under the external load; and in at least one instance,
        identify propagation of the crack along the interface element based on the strain energy release rate so calculated.

14. The computer-readable storage medium of claim 13, wherein the apparatus being caused to define the interface elements includes, for each respective interface of the plurality of interfaces, the apparatus being caused to define a succession of interface elements such that at least one outer node pair of one interface element is positioned at a bound node pair of an adjacent interface element.

15. The computer-readable storage medium of claim 13, wherein the apparatus being caused to define the interface elements include being caused to define the interface elements such that the nodes of each bound node pair have infinite stiffness therebetween, and the nodes of each outer node pair have zero stiffness therebetween, and
    wherein the apparatus being caused to identify the propagation of the crack includes being caused to assign a zero stiffness between the nodes of each bound node pair within the interface element, through which the crack propagates.

16. The computer-readable storage medium of claim 13, wherein the nodes of the bound node pairs are coincident with one another prior to the propagation of the crack, and
    wherein the apparatus being caused to identify the propagation of the crack includes being caused to:
    identify propagation of the crack between the nodes of at least one bound node pair; and in response thereto,
    unbind the nodes of the at least one bound node pair such that the nodes thereof are non-coincident with one another to model propagation of the crack.

17. The computer-readable storage medium of claim 13, wherein the apparatus being caused to calculate the strain energy release rate includes being caused to:
    calculate at least one force between a bound node pair and a displacement between the nodes of an outer node pair of the interface element; and
    calculate the strain energy release rate based at least in part on the at least one force and the displacement.

18. The computer-readable storage medium of claim 13, wherein the apparatus being caused to perform the finite element failure analysis includes being caused to determine one or more failure modes of the structure based at least in part on the propagation of the crack.

* * * * *